United States Patent Office 3,473,553
Patented Oct. 21, 1969

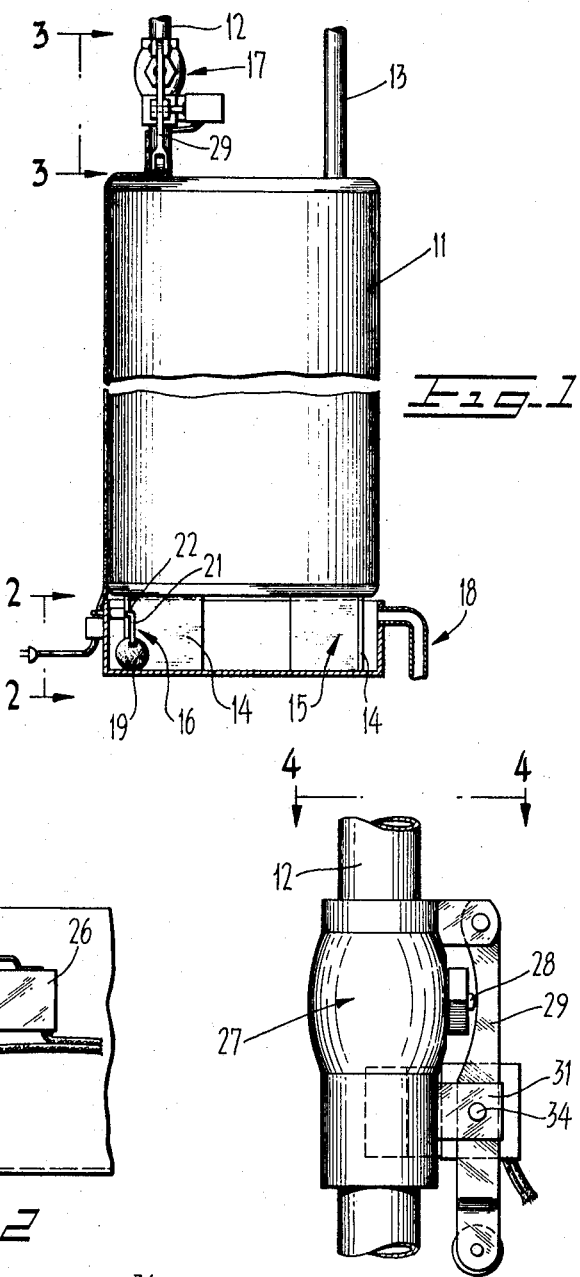

3,473,553
AUTOMATIC WATER CUT-OFF
WATER HEATERS
Thomas H. Collins, 40 Gelbke Lane,
Concord, Calif. 94520
Filed Nov. 16, 1966, Ser. No. 594,730
Int. Cl. F24h 9/20; F24d 17/00
U.S. Cl. 137—312    4 Claims

ABSTRACT OF THE DISCLOSURE

An apparatus for detecting a leak in a water heater tank and automatically shutting off flow of water through the inlet pipe when the tank leaks is described. An open topped water collecting tray is disposed beneath the tank to collect any leaking water, and a float actuated electrical switch means is disposed in the tray to close an electrical circuit upon water being collected in the tray to a predetermined height. The electrical circuit includes a solenoid which is actuated upon the closing of the switch to retract a pin from an arm of a cut-off valve located in the inlet pipe to thereby close the valve and stop water flow into the tank.

---

This invention relates to protective devices for water heaters, and is more particularly directed to a device for automatically shutting off the inlet pipe to a water heater tank when the tank leaks to thereby minimize further leaking.

Water heaters are typically provided with protective devices for automatically shutting off the supply of gas to the burner when the burner flame is extinguished due to leaking water, or other circumstances. Thus, when the tank is damaged and leaks, there is no danger of escaping gas due to an extinguished burner flame. However, with existing water heaters there is nothing to stop prolonged leaking of water from a damaged tank. Accordingly, a substantial quantity of water may run over adjacent household areas and damage flooring, and the like, before the damaged tank is detected.

It is therefore an object of the present invention to provide apparatus for automatically shutting off the supply of water to the tank of a water heater when the tank is damaged and begins to leak.

Another object of the invention is the provision of apparatus for preventing water leaking out of a damaged tank of a water heater from running over adjacent areas.

It is a further object of the invention to provide apparatus of the class described which is of relatively simple, low cost design.

The invention possesses other objects and features of advantage, some of which, with the foregoing will be set forth in the following description of the preferred form of the invention which is illustrated in the drawing accompanying and forming part of the specification.

FIGURE 1 is an elevational view of automatic water shut off apparatus in accordance with the present invention as employed with the tank of a water heater.

FIGURE 2 is an enlarged view taken at line 2—2 of FIGURE 1 of water leakage sensing means of the apparatus.

FIGURE 3 is an enlarged view taken at line 3—3 of FIGURE 1 of water cut off valve means of the apparatus.

FIGURE 4 is a view taken at line 4—4 of FIGURE 3.

Referring now to FIGURE 1, there is shown a water heater tank 11 having a water supply or inlet pipe 12 and outlet pipe 13 extending through the top thereof. The bottom of the tank is elevated from the floor upon legs 14 in the usual manner. When the tank is damaged and leaks, the water normally flows rapidly to the area underlying the tank and would normally run off over adjacent floor surfaces. Water would normally continue to leak from the tank until the leak is detected since water continues to enter the tank from the inlet pipe until the usual manually operated inlet valve is closed to cut off the supply of water.

The foregoing difficulties are overcome in accordance with the present invention by apparatus arranged to automatically cut off the supply of water to the tank from the inlet pipe 12 in response to the leakage of water from the tank. The apparatus may be further arranged to drain whatever small amount of leakage there is to a household sewer line, or the like, and thus prevent the water from running off over adjacent areas. More particularly, the apparatus generally includes water collecting means 15 disposed beneath the tank to collect water leaking therefrom. Water sensing means 16 are provided within the collecting means to detect the presence of water therein, and such sensing means are coupled to cut off valve means 17 in the inlet pipe 12. The valve means are arranged to be actuated to closed position responsive to the sensing of water by the sensing means. In this regard, the valve means is preferably of the electrically actuated variety, and the sensing means are then arranged to close an electrical circuit to the valve means when water leaks into the collecting means. The inlet pipe is thus automatically turned off when water leaks from the tank such that only water in the tank above the level of the leak can leak from the tank. Moreover, when the inlet pipe is closed by the valve means, a partial vacuum is established within the tank which tends to impede the flow of water from the leak. The flow of water to the collecting means is thus reduced to a trickle. If desired an overflow fitting 18 may be communicated with the collecting means and connected to a sewer line or the like to drain water therefrom and thereby prevent any water from running over adjacent areas.

Considering now the automatic cut-off apparatus outlined above in greater detail as to the preferred structure thereof, it is to be noted that the collecting means 15 is advantageously provided as an open topped tray which is arranged to fit beneath the tank 11. The water sensing means 16 preferably comprises a float actuated switch. More particularly, a float 19 is secured to the end of an arm 21 journalled for rotation on a side wall of the collecting tray for rotation about a horizontal axis. The arm has a right-angularly turned axle portion 22 that extends through the wall and terminates exteriorly in a right-angularly turned tab 23 in parallel adjacent relation to the exterior face of the wall. The tab engages the actuating plunger 24 of a microswitch 26 mounted on the exterior face of the wall. When the float rises due to water accumulated in the collecting tray from a leaking heater tank, the arm is pivoted upwardly (clockwise as viewed in FIGURE 2). The tab 23 is thus urged against the plunger 24 to depress same and close the switch 26.

The cut off valve means 17 preferably includes a valve 27 of a conventional type having an actuating plunger 28 which has one end resiliently urged outwardly of the valve housing when the valve is in a normally closed position. When the plunger 28 is depressed the valve is actuated to open position. The valve 27 is connected in the inlet pipe 12 in place of the hand wheel operated valve conventionally provided therein. An arm 29 is pivotally mounted on the body or housing of valve 27 to extend downwardly adjacent the body into engagement with the plunger 28. The free end of the arm extends into the slot between a pair of parallel spaced plates 31 which project outwardly from the valve body subjacent the plunger 28. The arm 29 is provided with an aperture 32 which is registerable with aligned apertures 33 through the plates when the arm is in a position substantially parallel to the valve body wherein the plunger is depressed and the valve is consequently in open position. A latch pin 34 extends through the apertures 32, 33 to thereby retain the arm in the previously noted valve opening position. The pin is retractable by means of a solenoid 36 mounted on the valve body. When the solenoid is energized, the pin is retracted from the arm aperture 32 to free the arm for pivotal movement. The outwardly spring loaded plunger 28 in turn moves outwardly to its normal valve closing position, and in so doing pivots the arm to the dotted line position indicated in FIGURE 3. The solenoid 36 and switch 26 are electrically connected in series with a power source (not shown), and thus when the switch is closed due to water collected in the collecting means 14, the solenoid is energized to effect release of the arm 31 and closure of the valve 27. The supply of water to the tank 11 from the inlet pipe 12 is thus cut-off.

What is claimed is:

1. In combination with a water heater tank having a water inlet pipe extending thereinto, water cut-off apparatus comprising collecting means disposed subjacent said tank to collect water leaking therefrom, cut-off valve means coupled in said inlet pipe, and water sensing means disposed in said collecting means and coupled to said valve means to actuate the latter to closed position responsive to the sensing of water in said collecting means, said collectiing means being an open topped tray, said sensing means being float actuated switch means including a float disposed in said tray, said valve means being electrically actuated valve means responsively connected to said switch, and comprising a valve housing having a spring loaded plunger mounted therein and controlling flow through said housing, a valve actuating arm pivotally mounted on said valve housing and engageable with said plunger, said arm having an aperture, a pair of parallel spaced plates projecting from said valve housing on the opposite side of said plunger from the pivot point of said arm, said arm received between said plates, said plates having aligned apertures registerable with the aperture of said arm when said arm depresses said plunger to an open position against the bias of said plunger, a pin extending through the registering apertures of said plates and arm and holding the plunger in said open position, and a solenoid coupled to said pin for retracting same from said apertures responsive to energization of the solenoid to provide for movement of the plunger under the bias of the spring to a closed position.

2. The combination of claim 1, further defined by said float actuated switch means comprising a switch actuating arm having said float secured to an end thereof, said switch actuating arm journalled on a side wall of said tray for rotation about a horizontal axis, said switch actuating arm having an axle portion extending through said side wall terminating exteriorly in a tab in parallel adjacent relation to said side wall, and a microswitch mounted on said side wall, said microswitch being normally open and having a depressible actuating plunger engaged by said tab.

3. The combination of claim 2, further defined by said tray having an overflow outlet for draining excess water therefrom.

4. In combination with a water heater tank having a water inlet pipe extending thereinto, water cut-off apparatus comprising collecting means disposed subjacent said tank to collect water leaking therefrom, electrically actuated cut-off valve means coupled in said inlet pipe, and water sensing means disposed in said collecting means and electrically coupled to said valve means to actuate the latter to closed position responsive to the sensing of water in said collecting means, said electrically actuated valve means including a valve housing having a spring loaded plunger mounted therein and controlling flow through said housing, one end of said plunger extending exteriorly of said housing and being spring biased outwardly thereof to a valve closing position, a valve actuating arm pivotally mounted on said valve housing and engageable with said end of said plunger, pin locking means locking said arm in a pivotal position depressing said plunger to maintain said plunger in a valve opening position against the bias of said spring loading, and a solenoid coupled to said pin for retracting same from said arm responsive to energization of said solenoid to provide for movement of said plunger under the bias of said spring loading to a valve closing position.

References Cited

UNITED STATES PATENTS

| 1,242,313 | 10/1917 | Beals | 137—412 XR |
| 2,631,829 | 3/1953 | Carraway | 137—412 XR |
| 2,798,503 | 7/1957 | Carver et al. | 137—67 |
| 3,063,432 | 11/1962 | Bond et al. | 122—504 |

WILLIAM F. O'DEA, Primary Examiner

R. GERARD, Assistant Examiner

U.S. Cl. X.R.

122—504; 137—412; 200—61.04; 251—68